March 16, 1954  J. R. BARR  2,672,595

ELECTRICAL CABLE CLAMP

Filed Dec. 5, 1952

Inventor:
James R. Barr,
by Gilbert P. Tarleton
His Attorney.

Patented Mar. 16, 1954

2,672,595

UNITED STATES PATENT OFFICE 2,672,595

ELECTRICAL CABLE CLAMP

James R. Barr, Pittsfield, Mass., assignor to General Electric Company, a corporation of New York Application December 5, 1952, Serial No. 324,317

5 Claims. (Cl. 339—202)

1

This invention relates to electrical cable clamps and more particularly to improvements in clamps of this type which are adapted to be used on electrical bushings.

In cable clamps in which two threadably engaged clamping members rotate relative to each other while moving towards each other to clamp the cable therebetween there is a tendency for the rotating members to shear the individual wire strands of which the cable is composed. Also, the cable clamps have loose or falling parts as well as exposed metal parts. Exposed metal parts are subject to corrosion and there is a danger that the lineman may electrocute himself. Also, exposed metal parts are undesirable in that birds perched adjacent to the cable clamp may ground the apparatus by simultaneously contacting the metal parts and a grounded object.

An object of this invention is to provide a cable clamp that will not cut or destroy the individual wire strands of which the cable is constructed during the clamping operation.

Another object of this invention is to provide a cable clamp that can be easily tightened and loosened with one hand and will have no loose or falling parts.

Still another object of this invention is to provide a cable clamp that will have no exposed metal parts so as to minimize corrosion, likelihood of electrocution of the lineman, and grounding of the apparatus by birds.

In accordance with this invention, there is provided a device comprising two clamping elements, one element being a sleeve having a swivel connection with a nut member, the other element being an eyebolt member with an integral clamping plate at one end and a bolt at the other end entering the nut member, said sleeve being prohibited from rotating relative to the clamping plate in its travel towards or away from said plate by a pin passing through said sleeve and the eye of said eyebolt, and two insulators telescopically enclosing the device.

The invention will be better understood by considering the following description taken in connection with the accompanying drawing, and its scope will be pointed out in the appended claims.

Figure 1:
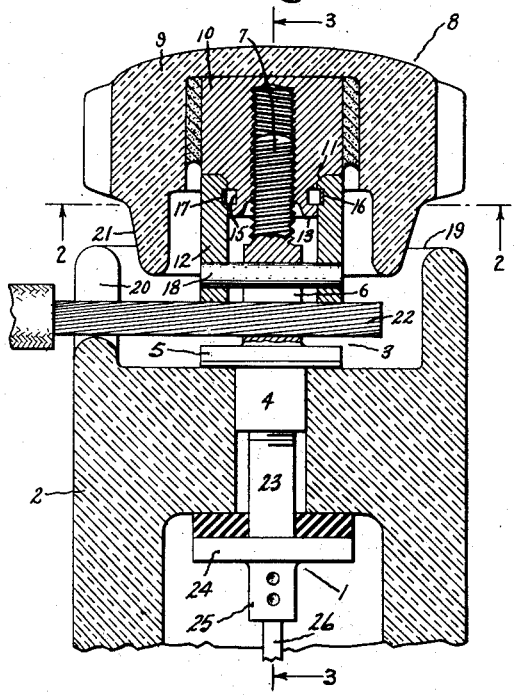
Figure 3:
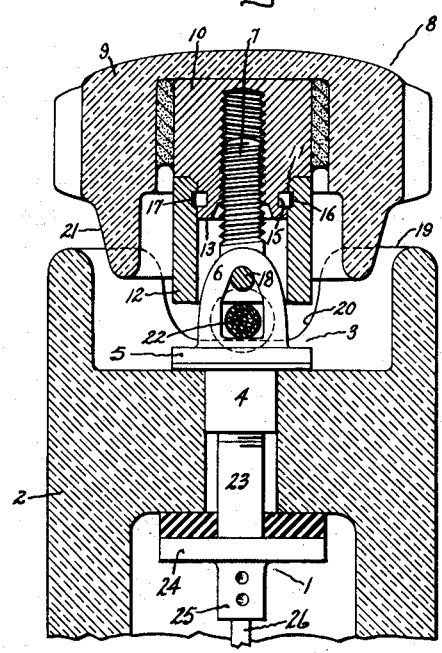
Figure 2:
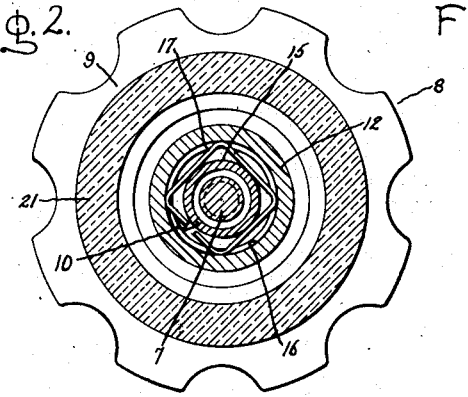
Figure 4:
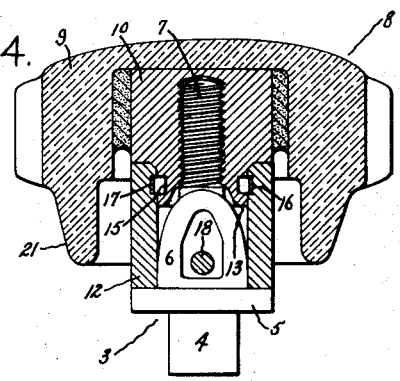

In the drawing, Figure 1 is a view partly in section of a preferred form of cable clamp embodying the invention in the open position. Figure 2 is a section on line 2—2 of Figure 1. Figure 3 is a section on line 3—3 of Figure 1, some of the parts being unsectioned for purposes of clarity. Figure 4 is a view of my device in the closed and unused position for protection against damage to metal parts.

Referring now to the drawing, and more particularly to Fig. 1, an electrical connector 1 and an eyebolt member 3 are mechanically connected and centrally mounted in a porcelain or other insulating material bushing 2 in clamping engagement therewith. Electrical connector 1 consists of three integrally joined parts, namely, a bolt portion 23, a flange 24, and a socket 25. An electrical conductor 26 is received in socket 25 and fixed therein, as by crimping. A rubber gasket is inserted between flange 24 and bushing 2 to form an oil tight seal. Eyebolt member 3 consists of four integrally joined parts, namely, a socket 4 into which connector bolt portion 23 is screwed, a clamping plate or flange 5 disposed generally perpendicular to the axis of bolt member 3, an eyelet or yoke 6, and an axially extending bolt 7. A pressboard washer is inserted between flange 5 and bushing 2.

Cooperating with the bolt 7 is a hand nut assembly 8 which comprises a knob 9 constructed of plastic or other insulating material, and a sleeve nut member 10 cemented to the inner surface of cup shaped knob 9, or knob 9 can be molded as an integral part thereof. Sleeve nut member 10 is internally threaded to receive bolt 7. A hollow clamping tube or sleeve member 12 concentrically disposed to bolt 7 is attached to the nut assembly 8 so that the nut assembly 8 may rotate relative to clamping tube or sleeve member 12. A groove 15 is formed on sleeve nut 10, said groove being defined in part by a lip 13. There is an annular groove 16 formed on the inner surface of clamping member 12 which will surround groove 15 when member 12 is slipped past lip 13 onto the nut member 10. Groove 15 is slightly deeper than groove 16. Clamping member 12 has a chamfer 11 on the inner end edge thereof adjacent groove 16. In grooves 15 and 16 is located a locking snap spring 17 which, as shown more clearly in Fig. 2, is of generally rectangular shape and split on one side.

Clamping tube or sleeve 12 is connected to the nut assembly 8 in the following manner. Spring 17 is placed in groove 15. Now clamping member 12 is slipped over lip 13 and pressure is applied to cause chamfer 11 to engage and compress spring 17 within groove 15. When spring 17 is thus compressed clamping member 12 can be advanced until groove 16 is aligned with groove 15. When groove 16 is aligned with groove 15 locking spring 17 will snap into groove 16 locking members 12 and 10 together.

A transversely extending pin 18 disposed between opposite ends of hollow member 12 passes through the eye of eyelet or yoke 6 and the clamping sleeve or tube 12. Pin 18 serves several purposes. It prevents clamping tube or sleeve 12 from rotating when nut assembly 8 is screwed down on bolt 7 to clamp the end of a cable 22 between the lower end surface of clamping member 12 and clamping member 5. This non-rotation of clamping tube 12 is desired since if 12 could rotate it would tend to cut or shear the wire strands of which the cable 22 is composed. The locking spring 17 holds the nut assembly 8 and clamping element 12 together so that when 8 is turned to fasten or remove the cable 22, clamping member 12 will move axially with nut assembly 8. That is, member 12 and nut assembly 8 have a swivel connection. However, during this axial movement pin 18, since it is held against rotation by the yoke or eyelet 6, will prohibit member 12 from rotating, so as to prevent cutting or shearing of the cable wire strands.

Another purpose of the pin 18 is to prevent falling parts. For instance, in attaching a cable to a high voltage bushing on a pole line distribution transformer the lineman may be compelled to work with only one hand. In Figs. 1 and 3 the cable clamp is illustrated in its maximum open position. The pin 18 is abutting the top of the axially extending aperture or eye of eyelet or yoke 6. At this point the parts cannot be separated any further because the pin 18 is at its maximum upward movement in the eye of eyelet or yoke 6. That is, because of this abutting relationship, there is no danger of the nut assembly 8 being totally removed from the eyebolt member 3. Simultaneously, member 12 is locked by spring 17 to nut assembly 8. Once opened, the clamping device will stay open due to threaded engagement of sleeve nut 10 and bolt 7. With one hand the lineman can insert the cable 22 into the eye of eyelet or yoke 6 and between clamping members 5 and 12. Still operating with one hand, the lineman can now rotate nut assembly 8 to clamp the cable between clamping elements 5 and 12.

When in use exposure of metal parts is kept to a minimum to prohibit corrosion, electrocution of the lineman, and grounding of the apparatus by birds perched adjacent to or on the cable clamp. As seen in Figs. 1 and 3, the bushing 2 has an annular lip 19 with a cut out or notch 20 for passage of the cable 22. Knob 9, which is adequately fluted so that it can be firmly gripped with one hand for turning, also has an annular lip 21. Lip 21 telescopically enters lip 19 so that there are substantially no exposed metal parts.

In Fig. 4 it will be seen that when the cable clamp is not in use the nut assembly 8 can be screwed down on bolt 7 until member 12 abuts flange 5 so that the sleeve nut 10, bolt 7, and eyelet 6 are adequately enclosed to prevent their deterioration by dirt and the like. Simultaneously, lip 21 will telescopically enter lip 19 and prohibit entry of dirt through cut out or notch 20.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What I claim as new and desire to secure by Letters Patent of the United States is:

1. A cable clamp comprising an eyebolt member, a nut member, and a clamping sleeve, said eyebolt member having an integral clamping plate at one end and the bolt at the other end being received in said nut member, said clamping sleeve having a swivel connection with said nut member, and a pin passing through said clamping sleeve and the eye of said eyebolt.

2. In a cable clamp as in claim 1, wherein said swivel connection comprises a groove in said nut member and clamping sleeve, and a snap spring in said grooves.

3. In a cable clamp as in claim 1, an insulating bushing having an annular lip surrounding said eyebolt member, said nut member having an insulating knob with an annular lip surrounding said clamping sleeve, one of said lips telescopically entering the other lip.

4. In a cable clamp, an insulating material bushing having an axial bore, an eyebolt member having a clamping flange and socket at the end thereof opposite from the bolt portion, said socket entering the bore of said bushing, a connector member having a bolt portion, flange, and socket, the bolt portion of said connector member mechanically connected to said eyebolt member socket, a rubber gasket between the connector member flange and bushing so as to form an oil tight seal when the bushing is clamped between the eyebolt and connector member flanges, said connector member socket adapted to receive an electrical conductor, a nut member threadably receiving the bolt portion of said eyebolt member, a clamping tube swivel connected to said nut member and prohibited from rotating with said nut member by a pin passing through said tube and the eye of said eyebolt member, an insulating knob on said nut member telescopically mating with said insulating bushing to enclose the clamping tube and eyebolt member from exposure.

5. A clamp comprising an externally threaded bolt member having a clamping plate connected thereto adjacent one end thereof and disposed generally perpendicular to the axis of said bolt member, a hollow clamping member concentrically disposed about said bolt member, an internally threaded nut member threadably engaged with said bolt member, said hollow clamping member connected adjacent one end thereof to said nut member whereby said nut and hollow clamping members are rotatably movable and axially immovable with respect to each other, an axially extending aperture in said bolt member adjacent said clamping plate, and a transversely extending member disposed between said one end and another end of said hollow clamping member connected to said hollow clamping member and protruding into said aperture to restrain said hollow clamping member from rotating with respect to said clamping plate when said hollow clamping member is moved towards said clamping plate during threaded axial movement of said nut member along said bolt member, said aperture adapted to receive a member to be clamped by said clamping plate and said another end therebetween, an insulating material knob connected to said nut member, said clamping plate connected to an insulating material member, said insulating material knob and member having telescopic portions cooperative to enclose said bolt, hollow clamping, and nut members, and clamping plate.

JAMES R. BARR.

References Cited in the file of this patent

UNITED STATES PATENTS

| Number | Name | Date |
|---|---|---|
| 1,420,846 | Karkau | June 27, 1922 |
| 2,518,489 | Orlando | Aug. 15, 1950 |

FOREIGN PATENTS

| Number | Country | Date |
|---|---|---|
| 58,339 | Austria | Mar. 26, 1913 |